(12) United States Patent
Kuik et al.

(10) Patent No.: US 7,730,210 B2
(45) Date of Patent: *Jun. 1, 2010

(54) VIRTUAL MAC ADDRESS SYSTEM AND METHOD

(75) Inventors: Timothy J. Kuik, Lino Lakes, MN (US); Mark A. Bakke, Maple Grove, MN (US)

(73) Assignee: Cisco Technology, Inc., San Jose, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 12/192,754

(22) Filed: Aug. 15, 2008

(65) Prior Publication Data

US 2009/0049199 A1 Feb. 19, 2009

Related U.S. Application Data

(63) Continuation of application No. 10/131,782, filed on Apr. 22, 2002, now Pat. No. 7,415,535.

(51) Int. Cl.
*G06F 15/16* (2006.01)
*G01R 31/08* (2006.01)

(52) U.S. Cl. .................. 709/245; 709/220; 370/217

(58) Field of Classification Search ............... 370/217; 709/245, 220–222; 714/4; 713/1, 100
See application file for complete search history.

(56) References Cited

U.S. PATENT DOCUMENTS

| | | | |
|---|---|---|---|
| 4,495,617 A | 1/1985 | Ampulski et al. |
| 5,390,326 A | 2/1995 | Shah |
| 5,461,608 A | 10/1995 | Yoshiyama |
| 5,473,599 A | 12/1995 | Li et al. |
| 5,491,812 A | 2/1996 | Pisello et al. |
| 5,535,395 A | 7/1996 | Tipley et al. |
| 5,544,077 A | 8/1996 | Hershey |
| 5,579,491 A | 11/1996 | Jeffries et al. |
| 5,600,828 A | 2/1997 | Johnson et al. |
| 5,642,337 A | 6/1997 | Oskay et al. |
| 5,666,486 A | 9/1997 | Alfieri et al. |
| 5,732,206 A | 3/1998 | Mendel |

(Continued)

OTHER PUBLICATIONS

*VMware ESX Server: User's Manual*, Version 1.0, obtained from http://web.archive.org/web/20010608201203/www.vmware.com/support, (Jun. 6, 2001), 122-124.

(Continued)

*Primary Examiner*—Philip J Chea
(74) *Attorney, Agent, or Firm*—Schwegman, Lundberg & Woessner, P.A.

(57) ABSTRACT

A method for creating a virtual MAC address, the method includes receiving an Internet Protocol address that is to be associated with a virtual MAC address. The method creates a virtual MAC address by setting an OUI portion of the virtual MAC address to an OUI value and setting the non-OUI portion of the virtual MAC address to a subset of the Internet Protocol (IP) address. In one embodiment, the lower three bytes of the IP address are used. Additionally, a method of migrating a virtual MAC address includes detecting a migration event on a first system; creating a virtual MAC address on a second system; and issuing a gratuitous ARP packet containing the virtual MAC address.

18 Claims, 5 Drawing Sheets

U.S. PATENT DOCUMENTS

| | | | |
|---|---|---|---|
| 5,812,821 A | 9/1998 | Sugi et al. | |
| 5,832,299 A | 11/1998 | Wooten | |
| 5,850,573 A | 12/1998 | Wada | |
| 5,870,571 A | 2/1999 | Duburcq et al. | |
| 5,909,544 A | 6/1999 | Anderson et al. | |
| 5,935,215 A | 8/1999 | Bell et al. | |
| 5,941,972 A | 8/1999 | Hoese et al. | |
| 5,951,683 A | 9/1999 | Yuuki et al. | |
| 5,991,813 A | 11/1999 | Zarrow | |
| 5,996,024 A | 11/1999 | Blumenau | |
| 5,996,027 A | 11/1999 | Volk et al. | |
| 6,006,259 A | 12/1999 | Adelman et al. | |
| 6,009,476 A | 12/1999 | Flory et al. | |
| 6,009,480 A | 12/1999 | Pleso | |
| 6,018,765 A | 1/2000 | Durana et al. | |
| 6,041,381 A | 3/2000 | Hoese | |
| 6,078,957 A | 6/2000 | Adelman et al. | |
| 6,108,300 A | 8/2000 | Coile et al. | |
| 6,108,699 A | 8/2000 | Moiin | |
| 6,131,119 A | 10/2000 | Fukui | |
| 6,134,673 A | 10/2000 | Chrabaszcz | |
| 6,145,019 A | 11/2000 | Firooz et al. | |
| 6,151,297 A | 11/2000 | Congdon et al. | |
| 6,151,331 A | 11/2000 | Wilson | |
| 6,163,855 A | 12/2000 | Shrivastava et al. | |
| 6,178,445 B1 | 1/2001 | Dawkins et al. | |
| 6,185,620 B1 | 2/2001 | Weber et al. | |
| 6,195,687 B1 | 2/2001 | Greaves et al. | |
| 6,195,760 B1 | 2/2001 | Chung et al. | |
| 6,199,112 B1 | 3/2001 | Wilson | |
| 6,209,023 B1 | 3/2001 | Dimitroff et al. | |
| 6,219,771 B1 | 4/2001 | Kikuchi et al. | |
| 6,268,924 B1 | 7/2001 | Koppolu et al. | |
| 6,269,396 B1 | 7/2001 | Shah et al. | |
| 6,314,526 B1 | 11/2001 | Arendt et al. | |
| 6,327,622 B1 | 12/2001 | Jindal et al. | |
| 6,343,320 B1 | 1/2002 | Fairchild et al. | |
| 6,353,612 B1 | 3/2002 | Zhu et al. | |
| 6,363,416 B1 | 3/2002 | Naeimi et al. | |
| 6,378,025 B1 | 4/2002 | Getty | |
| 6,392,990 B1 | 5/2002 | Tosey et al. | |
| 6,393,583 B1 | 5/2002 | Meth et al. | |
| 6,400,730 B1 | 6/2002 | Latif et al. | |
| 6,449,652 B1 | 9/2002 | Blumenau et al. | |
| 6,470,382 B1 | 10/2002 | Wang et al. | |
| 6,470,397 B1 | 10/2002 | Shah et al. | |
| 6,473,803 B1 | 10/2002 | Stern et al. | |
| 6,480,901 B1 | 11/2002 | Weber et al. | |
| 6,484,245 B1 | 11/2002 | Sanada et al. | |
| 6,560,630 B1 | 5/2003 | Vepa et al. | |
| 6,574,755 B1 | 6/2003 | Seon | |
| 6,591,310 B1 | 7/2003 | Johnson | |
| 6,597,956 B1 | 7/2003 | Aziz et al. | |
| 6,640,278 B1 | 10/2003 | Nolan et al. | |
| 6,654,830 B1 | 11/2003 | Taylor et al. | |
| 6,658,459 B1 | 12/2003 | Kwan et al. | |
| 6,665,702 B1 | 12/2003 | Zisapel et al. | |
| 6,678,721 B1 | 1/2004 | Bell | |
| 6,683,883 B1 | 1/2004 | Czeiger et al. | |
| 6,684,209 B1 | 1/2004 | Ito et al. | |
| 6,691,244 B1 | 2/2004 | Kampe et al. | |
| 6,697,875 B1 | 2/2004 | Wilson | |
| 6,697,924 B2 | 2/2004 | Swank | |
| 6,701,449 B1 | 3/2004 | Davis et al. | |
| 6,718,361 B1 | 4/2004 | Basani et al. | |
| 6,718,383 B1 | 4/2004 | Hebert | |
| 6,721,907 B2 | 4/2004 | Earl | |
| 6,724,757 B1 | 4/2004 | Zadikian et al. | |
| 6,728,780 B1 | 4/2004 | Hebert | |
| 6,738,854 B2 | 5/2004 | Hoese et al. | |
| 6,748,550 B2 | 6/2004 | McBrearty et al. | |
| 6,757,291 B1 | 6/2004 | Hu | |
| 6,760,783 B1 | 7/2004 | Berry | |
| 6,763,195 B1 | 7/2004 | Willebrand et al. | |
| 6,763,419 B2 | 7/2004 | Hoese et al. | |
| 6,766,520 B1 | 7/2004 | Rieschl et al. | |
| 6,771,663 B1 | 8/2004 | Jha | |
| 6,771,673 B1 | 8/2004 | Baum et al. | |
| 6,799,316 B1 | 9/2004 | Aguilar et al. | |
| 6,807,581 B1 | 10/2004 | Starr et al. | |
| 6,823,418 B2 | 11/2004 | Langendorf et al. | |
| 6,839,752 B1 | 1/2005 | Miller et al. | |
| 6,845,403 B2 | 1/2005 | Chadalapaka | |
| 6,848,007 B1 | 1/2005 | Reynolds et al. | |
| 6,856,591 B1 | 2/2005 | Ma et al. | |
| 6,859,462 B1 | 2/2005 | Mahoney et al. | |
| 6,874,147 B1 | 3/2005 | Diamant | |
| 6,877,042 B2 | 4/2005 | Tawil et al. | |
| 6,877,044 B2 | 4/2005 | Lo et al. | |
| 6,885,633 B1 | 4/2005 | Mikkonen | |
| 6,886,171 B2 | 4/2005 | MacLeod | |
| 6,889,338 B2 | 5/2005 | Srinivasan et al. | |
| 6,895,461 B1 | 5/2005 | Thompson | |
| 6,920,491 B2 | 7/2005 | Kim | |
| 6,922,743 B2 | 7/2005 | Mizuno | |
| 6,934,799 B2 | 8/2005 | Acharya et al. | |
| 6,938,092 B2 | 8/2005 | Burns | |
| 6,944,785 B2 | 9/2005 | Gadir et al. | |
| 6,954,436 B1 | 10/2005 | Yip et al. | |
| 6,959,439 B1 | 10/2005 | Boike | |
| 6,965,934 B1 | 11/2005 | Reynolds et al. | |
| 7,027,450 B2 | 4/2006 | Collette et al. | |
| 7,043,727 B2 | 5/2006 | Bennett et al. | |
| 7,165,258 B1 | 1/2007 | Kuik et al. | |
| 7,188,194 B1 | 3/2007 | Kuik et al. | |
| 7,200,610 B1 | 4/2007 | Prawdiuk et al. | |
| 7,240,098 B1 | 7/2007 | Mansee | |
| 7,281,062 B1 | 10/2007 | Kuik et al. | |
| 7,308,001 B2 | 12/2007 | Collette et al. | |
| 7,353,259 B1 | 4/2008 | Bakke et al. | |
| 7,389,332 B1 | 6/2008 | Muchow et al. | |
| 7,415,535 B1 | 8/2008 | Kuik et al. | |
| 2002/0010750 A1 | 1/2002 | Baretzki | |
| 2002/0023150 A1 | 2/2002 | Osafune et al. | |
| 2002/0042693 A1 | 4/2002 | Kampe et al. | |
| 2002/0049845 A1 | 4/2002 | Sreenivasan et al. | |
| 2002/0055978 A1 | 5/2002 | Joon-Bo et al. | |
| 2002/0059392 A1 | 5/2002 | Ellis | |
| 2002/0065872 A1 | 5/2002 | Genske et al. | |
| 2002/0103943 A1 | 8/2002 | Lo et al. | |
| 2002/0116460 A1 | 8/2002 | Treister et al. | |
| 2002/0126680 A1 | 9/2002 | Inagaki et al. | |
| 2002/0156612 A1 | 10/2002 | Schulter et al. | |
| 2002/0178143 A1 | 11/2002 | Fujimoto | |
| 2002/0188657 A1 | 12/2002 | Traversat et al. | |
| 2002/0188711 A1 | 12/2002 | Meyer et al. | |
| 2002/0194428 A1 | 12/2002 | Green | |
| 2003/0005068 A1 | 1/2003 | Nickel et al. | |
| 2003/0014462 A1 | 1/2003 | Bennett et al. | |
| 2003/0018813 A1 | 1/2003 | Antes et al. | |
| 2003/0018927 A1 | 1/2003 | Gadir et al. | |
| 2003/0037284 A1 | 2/2003 | Srinivasan et al. | |
| 2003/0058870 A1 | 3/2003 | Mizrachi et al. | |
| 2003/0084209 A1 | 5/2003 | Chadalapaka | |
| 2003/0097607 A1 | 5/2003 | Bessire | |
| 2003/0115447 A1 | 6/2003 | Pham et al. | |
| 2003/0140193 A1 | 7/2003 | Acharya et al. | |
| 2003/0145108 A1 | 7/2003 | Joseph et al. | |
| 2003/0149830 A1 | 8/2003 | Torr et al. | |
| 2003/0154236 A1 | 8/2003 | Dar et al. | |
| 2003/0182455 A1 | 9/2003 | Hetzler et al. | |
| 2003/0208579 A1 | 11/2003 | Brady et al. | |
| 2003/0210686 A1 | 11/2003 | Terrell et al. | |
| 2004/0024778 A1 | 2/2004 | Cheo | |

| | | |
|---|---|---|
| 2004/0064553 A1 | 4/2004 | Kjellberg |
| 2004/0141468 A1 | 7/2004 | Christensen |
| 2004/0233910 A1 | 11/2004 | Chen et al. |
| 2005/0055418 A1 | 3/2005 | Blanc et al. |
| 2005/0063313 A1 | 3/2005 | Nanavati et al. |
| 2005/0268151 A1 | 12/2005 | Hunt et al. |
| 2006/0265529 A1 | 11/2006 | Kuik et al. |
| 2007/0112931 A1 | 5/2007 | Kuik et al. |
| 2007/0286233 A1 | 12/2007 | Latif et al. |

OTHER PUBLICATIONS

"iSCSI Protocol Concepts and Implementation", White Paper, [online] Cisco Systems, Inc., 2001 [retrieved May 7, 2002]. Retrieved from the Internet: <URL: http://www.cisco.com/warp/public/cc/pd/rt/5420/prodlit/imdpm_wp.htm>, 16 p.

Babkin, S., "Writing a CAM SCSI Controller (A.K.A. Host Bus Adapter) Driver", [online]. 2000 [retrieved May 6, 2002] Retrieved from the Internet: <URL: http://www.daemonnews.org/200006/cam-driver.html>, 32 p.

Bakker, G., *IP Aliasing*, obtained from http://www.zone-h.org/files/24/ip_aliasing.txt, (1999), 3 pgs.

Gusella, R., et al., "An Election Algorithm for a Distributed Clock Synchronization Program", Report No. UCB/CSD 86/257, University of California, Berkeley, (Dec. 1985), 1-17.

Gusella, R., et al., "The Berkeley UNIX Time Synchronization Protocol", *UNIX Programmers Manual 4.3*, vol. 2C, Berkeley Software Distrib.,, (1986), 10 pgs.

Knight, S., et al., *Virtual Router Redundancy Protocol*, Network Working Group, RFC 2338, obtained from http://www.search.ietf.org/rfc/rfc2338.txt, (1998), 26 p.

Lewis, P., "A High-Availability Cluster for Linux", *Linux Journal*, 64, obtained from http://www2.linuxjournal.com/lj-issues/issue64/3247.html, (Apr. 1994), 11 p.

Li, T., et al., *Cisco Hot Standby Router Protocol (HSRP)*, Network Working Group, RFC 2281, obtained from http://www.search.ietf.org/rfc/rfc2281.txt, (1998), 16 p.

Meth, K. Z, et al., "Design of the iSCSI protocol", *Proceedings of the 20th IEEE Conference on Mass Storage Systems and Technologies*, (Apr. 7-10, 2003), 116-122.

Moore, K., *On the Use of HTTP as a Substrate*, Network Working Group, RFC 3205, obtained from http://search.ietf.org/rfc/rfc3205.txt, (2002), 14 p.

Satran, J., et al., "iSCSI", *IPS Internet Draft, draft-ietf-ips-iSCSI-12.txt, Category: standards—track*, (Apr. 17,2 002), 260 pgs.

Satran, J., et al., "iSCSI", *IPS Internet Draft, draft-ietf-ips-iSCSI-00, Category: Standards Track*, Retrieved from the Internet: <URL: http://www.haifa.il.ilb.com/satran/ips/draft-ietf-ips-iSCSI-00.txt>, (Nov. 2000), 78 pgs.

Simitci, H., et al., "Evaluation of SCSP over TCP/IP and SCSI over fibre channel connections", *Hot Interconnects*, 9, (Aug. 2001), 87-91.

US 7,231,429, 06/2007, Muchow (withdrawn)

US 7,366,791, 04/2008, Kuik et al. (withdrawn)

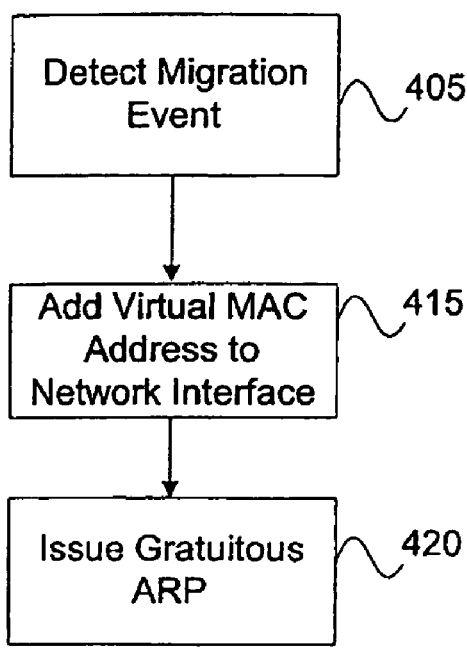
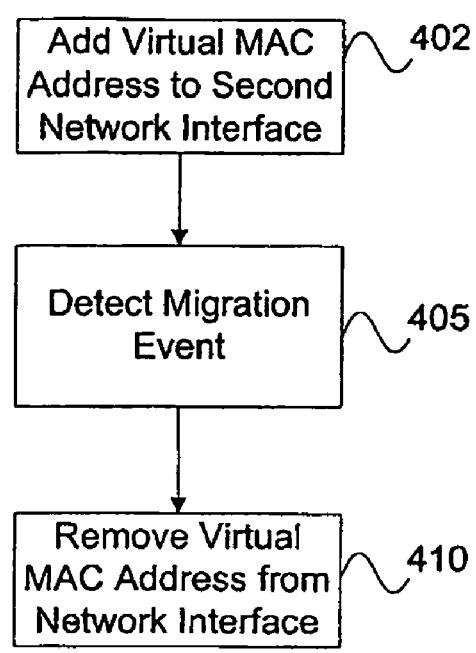
FIG. 4A
FIG. 4B

VIRTUAL MAC ADDRESS SYSTEM AND METHOD

This application is a continuation of U.S. patent application Ser. No. 10/131,782, titled "VIRTUAL MAC ADDRESS SYSTEM AND METHOD", filed on Apr. 22, 2002, now U.S. Pat. No. 7,415,535 which is incorporated herein by reference.

FIELD

The present invention relates generally to network addressing, and more particularly to creating a virtual MAC address.

RELATED FILES

This application is related to application Ser. No. 10/122,401, filed Apr. 11, 2002, now U.S. Pat. No. 7,389,332, issued on Jun. 17, 2008, entitled "METHOD AND APPARATUS FOR SUPPORTING COMMUNICATIONS BETWEEN NODES OPERATING IN A MASTER-SLAVE CONFIGURATION", which is a continuation of application Ser. No. 09/949,182, filed Sep. 7, 2001, now abandoned, entitled "METHOD AND APPARATUS FOR SUPPORTING COMMUNICATIONS BETWEEN NODES OPERATING IN A MASTER-SLAVE CONFIGURATION"; application Ser. No. 10/094,552, filed Mar. 7, 2002, now U.S. Pat. No. 7,421,478, issued on Sep. 2, 2008 entitled "METHOD AND APPARATUS FOR EXCHANGING HEARTBEAT MESSAGES AND CONFIGURATION INFORMATION BETWEEN NODES OPERATING IN A MASTER-SLAVE CONFIGURATION"; application Ser. No. 10/131,275, filed even date herewith, entitled "METHOD AND APPARATUS FOR CONFIGURING NODES AS MASTERS OR SLAVES"; application Ser. No. 10/131,274, filed even date herewith, entitled "METHOD AND APPARATUS FOR TERMINATING APPLICATIONS IN A HIGH-AVAILABILITY NETWORK", application Ser. No. 10/128,656, filed even date herewith, now U.S. Pat. No. 7,165,258, issued on Jan. 16, 2007, entitled "SCSI-BASED STORAGE AREA NETWORK"; application Ser. No. 10/131,793, filed even date herewith, now U.S. Pat. No. 7,281,062, issued on Oct. 9, 2007, entitled "VIRTUAL SCSI BUS FOR SCSI-BASED STORAGE AREA NETWORK"; application Ser. No. 10/131,789, filed even date herewith, now U.S. Pat. No. 6,895,461, issued on May 17, 2005, entitled "METHOD AND APPARATUS FOR ASSOCIATING AN IP ADDRESS AND INTERFACE TO A SCSI ROUTING INSTANCE"; application Ser. No. 10/128,657, filed even date herewith, now U.S. Pat. No. 7,353,259, issued on Apr. 1, 2008, entitled "METHOD AND APPARATUS FOR EXCHANGING CONFIGURATION INFORMATION BETWEEN NODES OPERATING IN A MASTER-SLAVE CONFIGURATION"; provisional application Ser. No. 60/374,921, filed even date herewith, entitled "INTERNET PROTOCOL CONNECTED STORAGE AREA NETWORK"; and application Ser. No. 10/128,993, filed even date herewith, now U.S. Pat. No. 7,188,194, issued on Mar. 6, 2007, entitled "SESSION-BASED TARGET/LUN MAPPING FOR A STORAGE AREA NETWORK AND ASSOCIATED METHOD"; all of the above of which are hereby incorporated by reference.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2002, Cisco Systems, Inc. All Rights Reserved.

BACKGROUND

When network interface cards were first developed, each card was assigned a unique MAC (Media Access Control) address that was "burned" into the memory of the interface card. Modern network interface cards support the ability to dynamically assign MAC addresses.

Many modern network interfaces support the dynamic assignment of MAC addresses. This ability has proven useful in high availability/fault tolerant applications, many of which use the ability to assign a MAC address in order to migrate a MAC address from one interface to another. One example of such usage is described in RFC 2338 from the Internet Engineering Task Force entitled "Virtual Router Redundancy Protocol" (VRRP). RFC 2338 defines a mechanism for providing virtual router IP addresses on a LAN to be used as the default first hop router by end-hosts. The advantage gained from using VRRP is a higher availability default path without requiring configuration of dynamic routing or router discovery protocols on every end-host.

While VRRP provides a virtual MAC address, it suffers from the problem that only 256 unique MAC addresses can be defined, which can be well short of the number required on many networks.

SUMMARY

The above-mentioned shortcomings, disadvantages and problems are addressed by the present invention, which will be understood by reading and studying the following specification.

In one embodiment of the invention, a method for creating a virtual MAC address, the method includes receiving an Internet Protocol-address that is to be associated with a virtual MAC address. The method creates a virtual MAC address by setting an OUI portion of the virtual MAC address to an OUI value and setting the non-OUI portion of the virtual MAC address to a subset of the Internet Protocol (IP) address. In one embodiment, the lower three bytes of the IP address are used.

In a further embodiment of the invention, a method of migrating a virtual MAC address includes detecting a migration event on a first system; creating a virtual MAC address on a second system; and issuing a gratuitous ARP packet containing the virtual MAC address.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

BRIEF DESCRIPTION OF THE DRAWINGS

FIGS. 4A and 4B are flowcharts illustrating methods for using a virtual MAC address according to an embodiment of the invention.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

Figure 1:
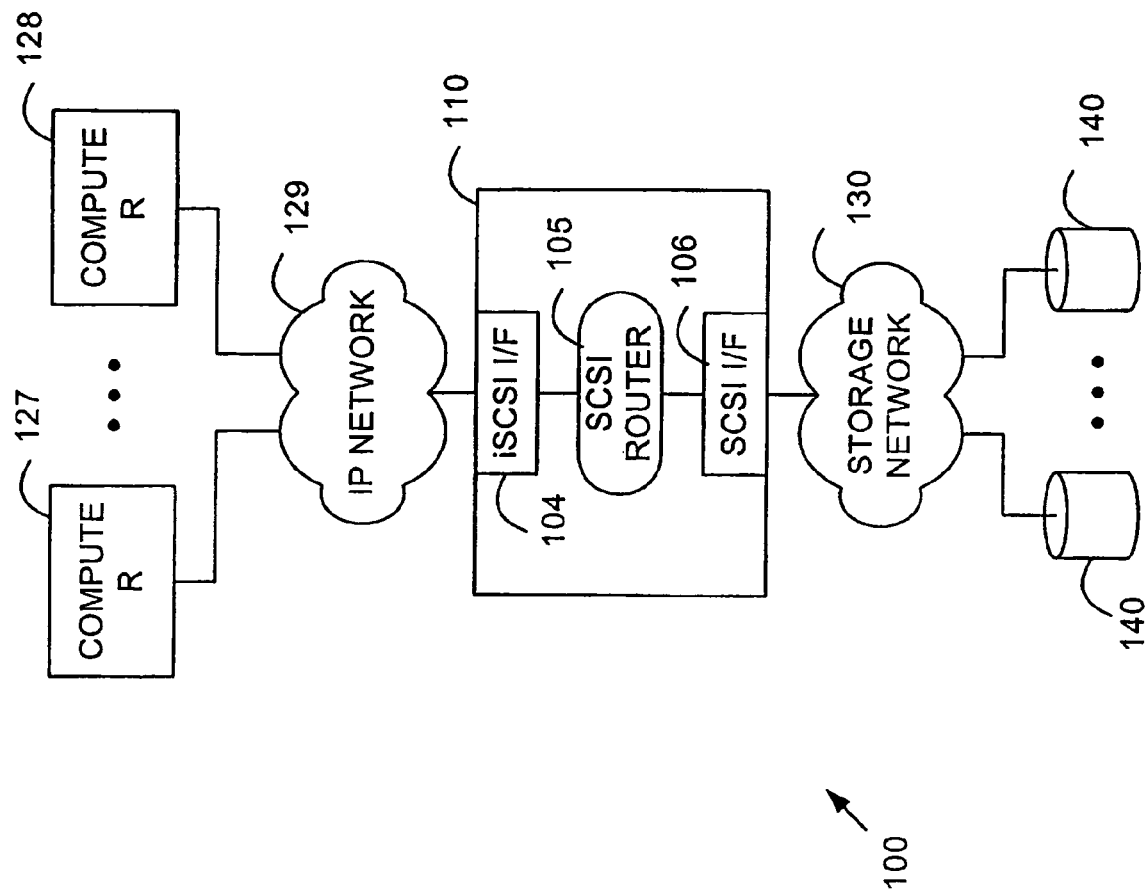
FIG. 1 is a block diagram of a storage router hardware and operating environment in which different embodiments of the invention can be practiced.

Some embodiments of the invention operate in an environment of systems and methods that provide a means for fibre-channel bases SANs to be accessed from TCP/IP network hosts. FIG. 1 is a block diagram describing the major components of such a system. Storage router system 100 includes computers (127, 128) connected through an IP network 129 to storage router 110. Storage router 110 is connected in turn through storage network 130 to one or more SCSI devices 140. In the embodiment shown in FIG. 3, storage router 110 includes an iSCSI interface 104, a SCSI router 105 and a SCSI interface 106. iSCSI interface 104 receives encapsulated SCSI packets from IP network 129, extracts the SCSI packet and send the SCSI packet to SCSI router 105. SCSI interface 106 modifies the SCSI packet to conform with its network protocol (e.g., Fibre Channel, parallel SCSI, or iSCSI) and places the modified SCSI packet onto storage network 130. The SCSI packet is then delivered to its designated SCSI device 140.

In one embodiment, storage router 110 provides IPv4 router functionality between a single Gigabit Ethernet and a Fibre Channel interface. In one such embodiment, static routes are supported. In addition, storage router 110 supports a configurable MTU size for each interface, and has the ability to reassemble and refragment IP packets based on the MTU of the destination interface.

In one embodiment, storage router 110 acts as a gateway, converting SCSI protocol between Fibre Channel and TCP/IP. Storage router 110 is configured in such an embodiment to present Fibre Channel devices as iSCSI targets, providing the ability for clients on the IP network to directly access storage devices.

In one embodiment, SCSI routing occurs in the Storage Router 110 through the mapping of physical storage devices to iSCSI targets. An iSCSI target (also called logical target) is an arbitrary name for a group of physical storage devices. You can map an iSCSI target to multiple physical devices. An iSCSI target always contains at least one Logical Unit Number (LUN). Each LUN on an iSCSI target is mapped to a single LUN on a physical storage target.

Figure 2:
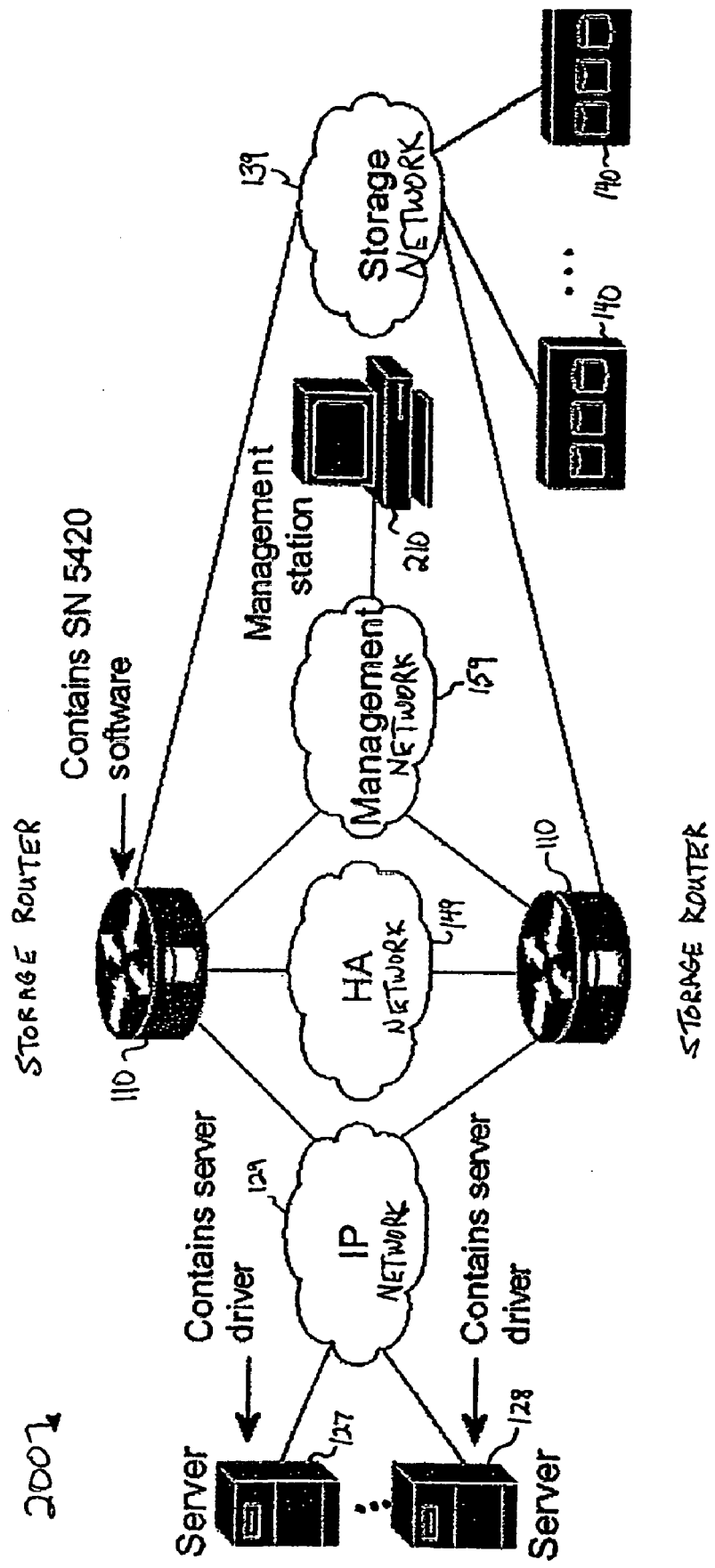
FIG. 2 is a diagram providing further details of a storage router configuration supporting high availability applications according to an embodiment of the invention.

FIG. 2 shows a sample storage router network 200. Servers 127-128 with iSCSI drivers access the storage routers 110 through an IP network 129 connected to the Gigabit Ethernet interface 104 of each storage router 110. The storage routers 110 access storage devices 140 through a storage network 138 connected to the Fibre Channel interface 106 of each storage router 110. A management station 210 manages the storage routers 110 through an IP network 159 connected to the management interface 158 and/or 168 of each storage router. For high-availability operation, the storage routers 110 communicate with each other over two networks: the HA network 149 connected to the HA interface 148 of each storage router 110, and the management network 159 connected to the management interface 158 and/or 168 of each storage router 110.

In some embodiments of the invention, SCSI router applications 105 are configured with their own TCP/IP address. Further, in some embodiments, Gigabit Ethernet interface 104 supports the ability to assign multiple MAC (Media Access Control) addresses. As is known in the art, MAC addresses are 48 bits in length and are expressed as 12 hexadecimal digits. The first 6 hexadecimal digits, which are administered by the IEEE, identify the manufacturer or vendor and thus comprise the Organizational Unique Identifier (OUI). The last 6 hexadecimal digits comprise the interface serial number. Thus the system may associate a uniquely created virtual MAC address for each instance of a SCSI router 105.

Further details on the operation of the above described system, including high availability embodiments can be found in application Ser. No. 10/094,552, filed Mar. 7, 2002, entitled "METHOD AND APPARATUS FOR EXCHANGING HEARTBEAT MESSAGES AND CONFIGURATION INFORMATION BETWEEN NODES OPERATING IN A MASTER-SLAVE CONFIGURATION"; application Ser.

No. 10/131,275, filed even date herewith, entitled "METHOD AND APPARATUS FOR CONFIGURING NODES AS MASTERS OR SLAVES"; application Ser. No. 10/131,274, filed even date herewith, entitled "METHOD AND APPARATUS FOR TERMINATING APPLICATIONS IN A HIGH-AVAILABILITY NETWORK"; application Ser. No. 10/128,656, filed even date herewith, now U.S. Pat. No. 7,165,258, issued on Jan. 16, 2007, entitled "SCSI-BASED STORAGE AREA NETWORK"; application Ser. No. 10/131,793, filed even date herewith, now U.S. Pat. No. 7,281,062, issued on Oct. 9, 2007, entitled "VIRTUAL SCSI BUS FOR SCSI-BASED STORAGE AREA NETWORK"; application Ser. No. 10/131,789, filed even date herewith, now U.S. Pat. No. 6,895,461, issued on May 17, 2005, entitled "METHOD AND APPARATUS FOR ASSOCIATING AN IP ADDRESS AND INTERFACE TO A SCSI ROUTING INSTANCE"; application Ser. No. 10/128,657, filed even date herewith, now U.S. Pat. No. 7,353,259, issued on Apr. 1, 2008, entitled "METHOD AND APPARATUS FOR EXCHANGING CONFIGURATION INFORMATION BETWEEN NODES OPERATING IN A MASTER-SLAVE CONFIGURATION"; provisional application Ser. No. 60/374,921, filed even date herewith, entitled "INTERNET PROTOCOL CONNECTED STORAGE AREA NETWORK", all of which have been previously incorporated by reference.

Figure 3:
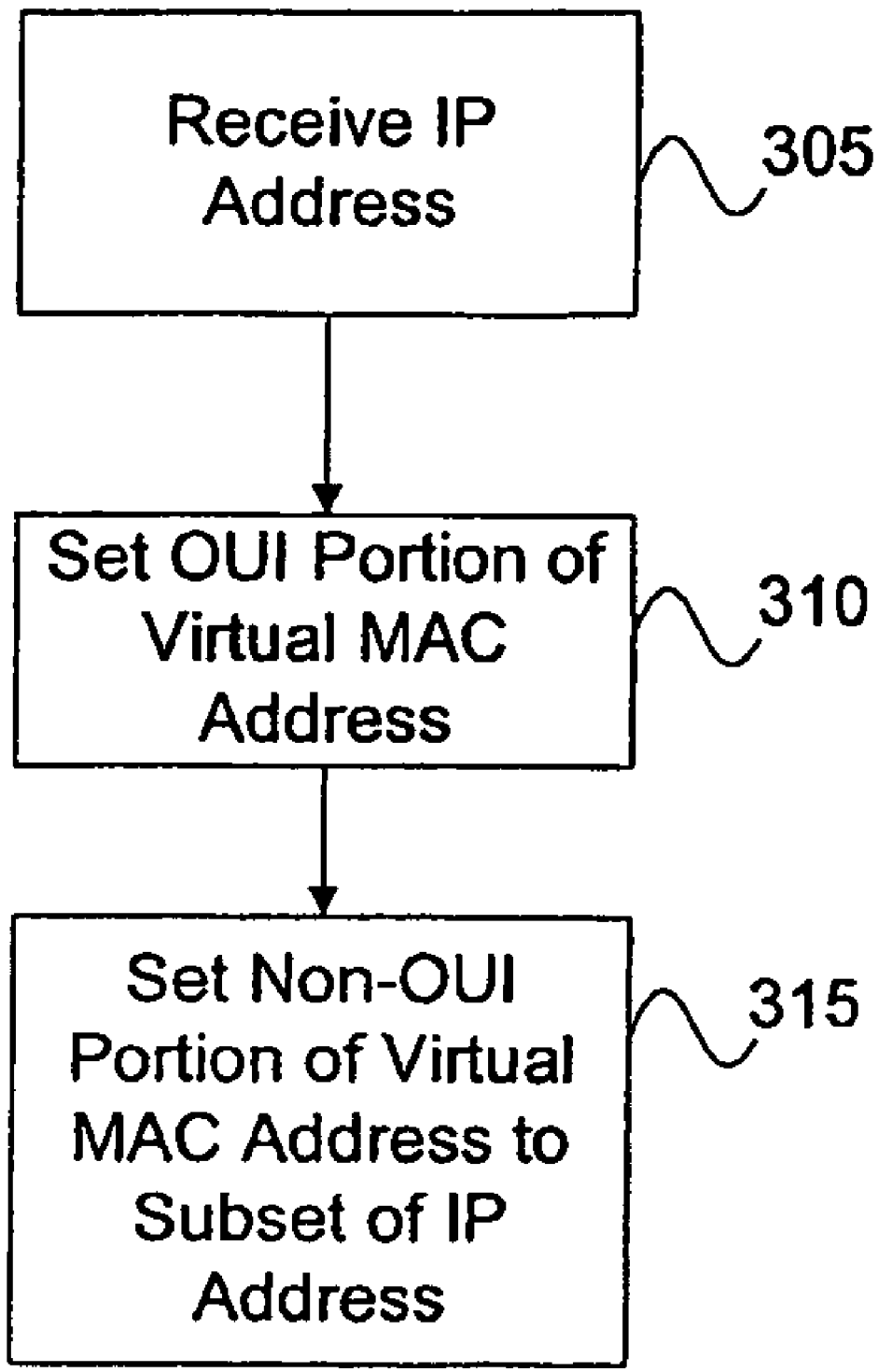
FIG. 3 is a flowchart illustrating methods for creating a virtual MAC address according to an embodiment of the invention.

FIG. 3 illustrates a method for creating a virtual MAC address according to an embodiment of the invention. A system desiring to create a virtual MAC address begins by receiving an IP address that is to be associated with the desired virtual MAC address (block 305). The IP address can be specified as a parameter to a function that creates virtual MAC addresses. Alternatively, the IP address can be determined through configuration databases. The invention is not limited to any particular method for receiving an IP address.

A system executing the method then sets the OUI portion of the virtual MAC address (block 310). As discussed above, the OUI is used to identify a manufacturer or vendor of a network interface. In some embodiments of the invention, the "local bit" of the OUI portion of the MAC address is set. As is known in the art, the local bit is intended to indicate that the MAC address need only be unique on network segments reachable through the network interface.

Next, a system executing the method sets the non-OUI portion (i.e. the serial number portion) of the MAC address to a subset of the IP address received above (block 315). In some embodiments of the invention, the three lower order bytes of the IP address are copied to the three non-OUI bytes of the virtual MAC address.

FIG. 4A illustrates a method of using a virtual MAC address employed by some embodiments of the invention. A system executing the method, such as storage router system 100, begins by detecting a migration event (block 405). A migration event is one that requires a MAC address to be migrated from a first network interface to a second network interface. The first network interface and the second network interface may be on the same network element, or they may be on different network elements.

One example of a migration event is a failover event. In this case, some system failure causes an application to be migrated to a different system. In the case of the storage router described above in FIG. 1, a failover event can be the failure of a SCSI router application. Because each SCSI router application has an IP address associated with it, and because each IP address has a MAC associated with it, it is desirable for the MAC to migrate with the application.

Next, the virtual MAC is added to the network interface (block 415). In some embodiments, the virtual MAC is created using them method described above in FIG. 3. In particular embodiments of the invention where the network element is a storage router device in a high availability configuration, the IP address used to create the virtual MAC address will be that of an application that is failed over to a second storage router. In these embodiments, the IP address is read from a configuration database replicated on each storage router that is a member of the high availability configuration.

Finally, in some embodiments of the invention, the second network interface issues a "gratuitous" ARP packet (block 420). The packet is gratuitous in that it is not issued in response to an ARP request. The gratuitous ARP is desirable, because it causes other network elements in the network such as switches and routers to update their respective ARP tables more quickly than they would through normal address resolution mechanisms that rely on timeouts.

FIG. 4B illustrates a method for removing a virtual MAC address. The method begins with the creation of a virtual MAC address (block 402). The virtual MAC address is assigned to a network interface and will typically be associated with an application such as a SCSI router application. Next the system detects a migration event (block 405). Finally, a system executing the method next removes the virtual MAC address from the first interface (block 410). This occurs in order to prevent the first network interface from responding to subsequent ARP requests after the migration event occurs.

It should be noted that the method in FIG. 4B is a complement to the method in FIG. 4A. The method illustrated in FIG. 4B may be used when there has not been a catastrophic failure such as a system crash or power down. In the event of a catastrophic failure, the virtual MAC will have been implicitly removed by virtue of the fact that the network element is no longer functioning.

Figure 5:
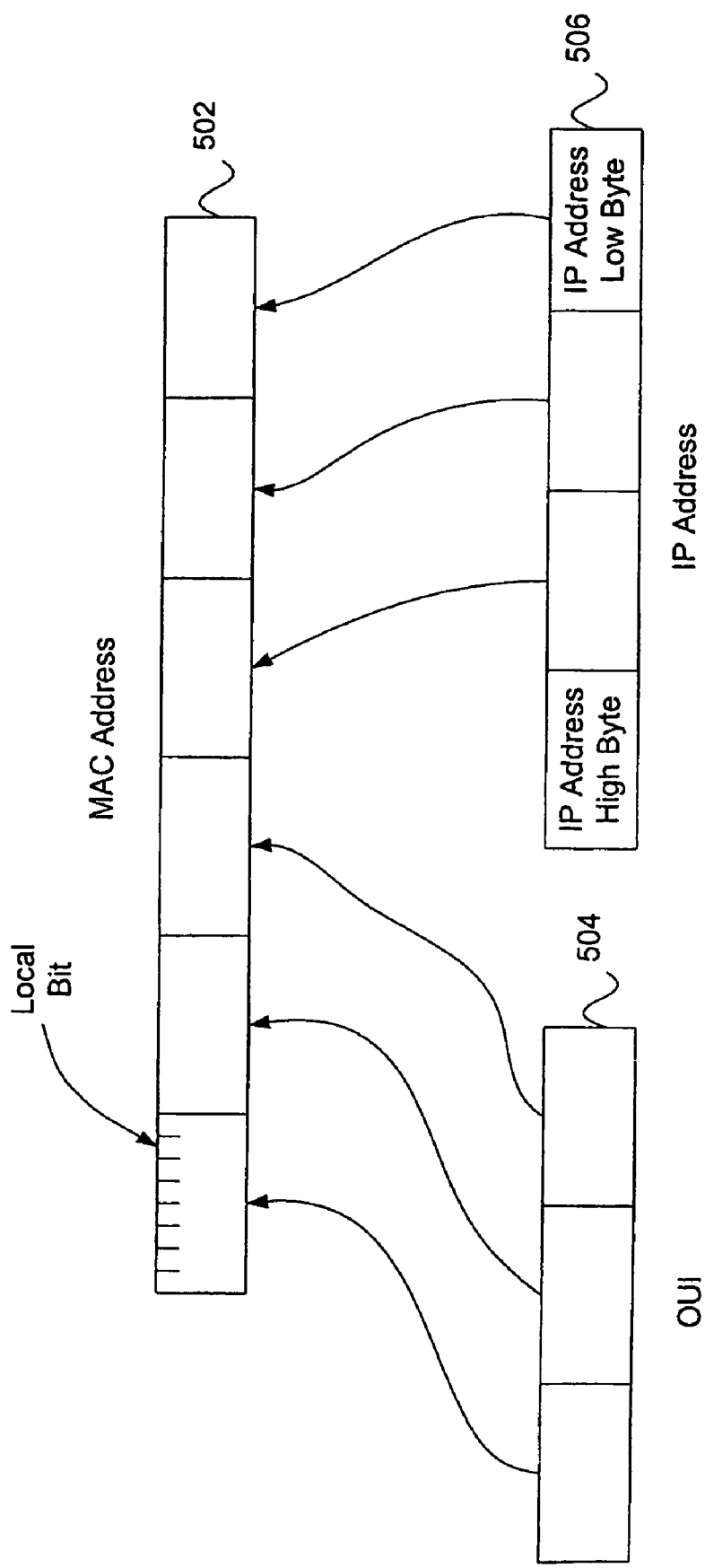
FIG. 5 is a pictorial diagram illustrating the method of FIG. 3.

FIG. 5 provides a pictorial description of the creation of a virtual MAC address 502. Each block in FIG. 5 represents an 8-bit byte. As can bee seen from the illustration, a three-byte OUI is placed in the upper three-bytes of MAC address 502. Additionally, the lowest three bytes of the IP address 506 are copied to the lowest three bytes of the MAC address 502, resulting in an MAC address that is guaranteed to be unique on any subnet in which the IP address is valid.

It should be noted that a different number of bytes or bits of the IP address could be used and such use is within the scope of the invention.

This section has described the various software components in a system that creates virtual MAC addresses and migrates virtual MAC addresses. As those of skill in the art will appreciate, the software can be written in any of a number of programming languages known in the art, including but not limited to C/C++, Visual Basic, Smalltalk, Pascal, Ada and similar programming languages. The invention is not limited to any particular programming language for implementation.

Besides executing the various embodiments on a general-purpose computer system, computer executable instructions for performing the methods of the various embodiments can be stored on one or more computer readable media. For example, such computer executable instructions can be stored on RAM, ROM, hard drive, CD, magnetic disk, disk drive, a combination of these types of storage media, and/or other types of storage media that are well known to those of skill in the art.

CONCLUSION

Systems and methods creating and using a virtual MAC address are disclosed. The embodiments of the invention provide advantages over previous systems. For example, the systems and methods allow for the creation range of MAC addresses that are as unique as the IP addresses that can be defined within the system. Further, the association of an IP address with a virtual MAC address provides for the easy creation of unique virtual MAC addresses that can be easily migrated to other systems.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

We claim:

1. A method for creating a virtual MAC address, the method comprising:
    configuring in a configuration for a first network attached system a plurality of Internet Protocol (IP) addresses for each of a plurality of applications executing on the first network attached system, wherein each of the plurality of applications is provided a different IP address;
    replicating the configuration to a second network attached system;
    creating a plurality of virtual MAC (Media Access and Control) addresses, each virtual MAC address associated with one of the different IP addresses;
    setting a non-OUI portion of the virtual MAC address to a subset of the Internet Protocol (IP) address associated with the virtual MAC address;
    detecting a migration event on the first network attached system;
    initializing the plurality of applications on the second network attached system according to the replicated configuration, wherein each of the plurality of applications is assigned the different IP address according to the replicated configuration; and
    recreating on the second network attached system the plurality of virtual MAC addresses, each virtual MAC address associated with one of the different IP addresses and each created on the second network attached system by setting a non-OUI portion of each virtual MAC address to a subset of the different Internet Protocol (IP) address associated with the virtual MAC address.

2. The method of claim 1, further comprising setting the local bit of an OUI portion of the virtual MAC address.

3. The method of claim 1, wherein the subset of the IP address comprises three bytes.

4. The method of claim 1, wherein the subset of the IP address comprises a subset of the low order bytes of the IP address.

5. The method of claim 1, further comprising removing the virtual MAC address on the first network interface to be migrated.

6. The method of claim 1, wherein the migration event is a failover event.

7. A system comprising:
    a first network attached system having one or more processors and a plurality of applications executed by the one or more processors, each application having a different IP address;
    a configuration to maintain each of the different IP addresses for the plurality of applications, the configuration stored in at least one computer-readable medium;
    a first network interface coupled to the one or more processors of the first network attached system, the first network interface configured with a plurality of MAC addresses, wherein a MAC address of the plurality of MAC addresses is associated with the different IP address of one of the plurality of applications; and
    a second network attached system having one or more processors coupled to a second network interface coupled to the network, the second network attached system to:
        receive a replicated configuration corresponding to the configuration on the first network attached system,
        in response to a migration event, initialize on the second network attached system the plurality of applications according to the replicated configuration, wherein each of the plurality of applications is assigned the different IP address according to the replicated configuration, and
        recreate on the second network attached system the plurality of virtual MAC addresses, each virtual MAC address associated with one of the different IP addresses; wherein each MAC address of the plurality of MAC addresses includes a non-OUI portion that comprises a subset of the different IP address associated with the MAC address.

8. The system of claim 7, wherein the local bit of an OUI portion of each virtual MAC address is set.

9. The system of claim 7, wherein the subset of the IP address comprises three bytes.

10. The system of claim 7, wherein the subset of the IP address comprises a subset of the low order bytes of the IP address associated with the MAC address.

11. The system of claim 7, wherein the migration event comprises a failure of one or more of the plurality of applications in the first network attached system.

12. A computer-readable storage medium having stored thereon a method for creating a virtual MAC address, the method comprising:
    configuring in a configuration for a first network attached system a plurality Internet Protocol (IP) addresses for each of a plurality of applications executing on the first network attached system, wherein each of the plurality of applications is provided a different IP address;
    replicating the configuration to a second network attached system;
    creating a plurality of virtual MAC (Media Access and Control) addresses, each virtual MAC address associated with one of the different IP addresses;
    setting a non-OUI portion of the virtual MAC address to a subset of the Internet Protocol (IP) address associated with the virtual MAC address;
    detecting a migration event on the first network attached system;

initializing the plurality of applications on the second network attached system according to the replicated configuration, wherein each of the plurality of applications is assigned the different IP address according to the replicated configuration; and recreating on the second network attached system the plurality of virtual MAC addresses, each virtual MAC address associated with one of the different IP addresses and each created on the second network attached system by setting a non-OUI portion of each virtual MAC address to a subset of the different Internet Protocol (IP) address associated with the virtual MAC address.

13. The computer-readable storage medium of claim 12, wherein the method further comprises setting the local bit of an OUI portion of the virtual MAC address.

14. The computer-readable storage medium of claim 12, wherein the subset of the IP address comprises three bytes.

15. The computer-readable storage medium of claim 12, wherein the subset of the IP address comprises a subset of the low order bytes of the IP address.

16. The computer-readable storage medium of claim 12, wherein the method further comprises removing the virtual MAC address on the first network interface to be migrated.

17. The computer-readable storage medium of claim 12, wherein the migration event is a failover event.

18. A system comprising:

means for configuring in a configuration for a first network attached system having one or more processors coupled to at least one memory an IP address for each of a plurality of applications on the first network attached system, wherein each application of the plurality of applications is provided a different IP address, the means for configuring executed by the one or more processors;

means for replicating the configuration to a second network attached system having one or more processors coupled to at least one memory;

means for creating a plurality of virtual MAC address, each virtual MAC address associated with one of the different IP addresses;

means for setting a non-OUI portion of each virtual MAC address to a subset of the different IP address associated with the virtual MAC address means for detecting a migration event on the first network attached system;

means for initializing on the second network attached system the plurality of applications according to the replicated configuration, wherein each of the plurality of applications is assigned the different IP address according to the replicated configuration; and means for recreating on the second network attached system the plurality of virtual MAC addresses, each virtual MAC address associated with one of the different IP addresses and each created on the second network attached system by setting a non-OUI portion of each virtual MAC address to a subset of the different Internet Protocol (IP) address associated with the virtual MAC address.

* * * * *